(12) United States Patent
Kwag et al.

(10) Patent No.: US 8,999,536 B2
(45) Date of Patent: Apr. 7, 2015

(54) BATTERY PACK

(75) Inventors: Nohyun Kwag, Suwon-si (KR);
Youngho Kim, Suwon-si (KR);
Heongsin Kim, Suwon-si (KR);
Youngcheol Jang, Suwon-si (KR);
Seokryun Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1309 days.

(21) Appl. No.: 12/356,247

(22) Filed: Jan. 20, 2009

(65) Prior Publication Data

US 2009/0317703 A1    Dec. 24, 2009

Related U.S. Application Data

(60) Provisional application No. 61/074,549, filed on Jun. 20, 2008.

(51) Int. Cl.
*H01M 2/04* (2006.01)
*H01M 2/20* (2006.01)
*H01M 10/42* (2006.01)

(52) U.S. Cl.
CPC .......... *H01M 2/204* (2013.01); *Y10T 29/49114* (2015.01); *H01M 10/4207* (2013.01); *H01M 10/425* (2013.01)

(58) Field of Classification Search
CPC  H01M 10/425; H01M 2/204; H01M 10/4207
USPC ............... 439/500; 429/96–100, 122–128, 61
See application file for complete search history.

(56) References Cited

U.S. PATENT DOCUMENTS

| | | | |
|---|---|---|---|
| 5,418,083 A * | 5/1995 | Tamaki et al. | 429/53 |
| 6,773,848 B1 | 8/2004 | Nortoft et al. | |
| 2004/0119442 A1 | 6/2004 | Lee et al. | |
| 2005/0208346 A1 * | 9/2005 | Moon et al. | 429/7 |
| 2007/0037045 A1 | 2/2007 | Takeshita | |
| 2007/0037046 A1 * | 2/2007 | Takahashi et al. | 429/96 |
| 2009/0258285 A1 | 10/2009 | Kim | |

FOREIGN PATENT DOCUMENTS

| | | |
|---|---|---|
| EP | 1 808 915 A1 | 7/2007 |
| JP | 11-238498 | 8/1999 |
| JP | 2002-134077 | 5/2002 |
| JP | 2003-288872 | 10/2003 |

(Continued)

OTHER PUBLICATIONS

Machine translation of JP2005174707.*

(Continued)

*Primary Examiner* — Maria J Laios
(74) *Attorney, Agent, or Firm* — Knobbe Martens Olson & Bear LLP

(57) ABSTRACT

A battery pack is disclosed. The battery pack includes at least two battery cells to provide a high capacity battery pack. The battery pack includes a single PCM assembly controlling at least two battery cells to decrease inferiority due to overcharge and overdischarge. Since a connector tab electrically connecting at least two battery cells to a single PCM assembly is provided, contacts are not separated during the swelling of the battery cells to prevent contact inferiority. A top case and a bottom case are provided to be coupled with at least two battery cells to maintain a secure coupling between the at least two battery cells.

32 Claims, 16 Drawing Sheets

(56) References Cited

FOREIGN PATENT DOCUMENTS

| | | | |
|---|---|---|---|
| JP | 2003-530658 | 10/2003 | |
| JP | 2004-247198 | 9/2004 | |
| JP | 2004-311402 | 11/2004 | |
| JP | 2005-174707 | 6/2005 | |
| JP | 2005174707 A * | 6/2005 | ............. H01M 2/10 |
| JP | 2005-327477 | 11/2005 | |
| JP | 2006-040775 | 2/2006 | |
| JP | 2006-164579 | 6/2006 | |
| JP | 2007-073266 | 3/2007 | |
| KR | 10-2001-0056041 | 7/2001 | |
| KR | 10-2004-0054233 | 6/2004 | |
| KR | 1020060028175 | 3/2006 | |
| KR | 10 2007-001954 | 2/2007 | |
| KR | 10-2007-0068608 | 7/2007 | |
| KR | 10 2007-0108755 | 11/2007 | |
| KR | 10-2009-0108417 | 10/2009 | |
| WO | WO 2007/142428 | 12/2007 | |

OTHER PUBLICATIONS

Notice of Allowance dated Nov. 21, 2011 for corresponding KR Application No. 10-2009-0020215.

Extended European Search Report dated Feb. 27, 2013 for corresponding EP Application 09162879.2-1359/2136451.

* cited by examiner

BATTERY PACK

RELATED APPLICATION

This application claims the benefit of U.S. Provisional Application No. 61/074,549, filed Jun. 20, 2008, entitled BATTERY PACK, which is hereby incorporated by reference in its entirety.

BACKGROUND OF THE INVENTION

1. Field of the Invention

The present invention relates to a battery pack, and more particularly, to a battery pack having at least two battery cells in order to satisfy consumers demanding a high capacity battery pack.

2. Description of the Related Art

Recently, industries related to electronics, communications, computers, and the like are developing rapidly and due to the rapid development, there is an impatient demand for development of a reliable and high capacity small sized secondary battery.

Especially, the secondary battery must satisfy a demand from a mobile communication market for a small sized battery, a light weight battery, a long life battery, etc. For this reason, consumer demand for an extended capacity secondary battery is increasing.

To achieve the high capacity of the battery, there are possibly several proposals such as increasing the size of cells and connecting a plurality of cells to each other within a single battery pack. The proposal of increasing the size of cells is retrogressive in that it represents a less efficient solution. Therefore, there is a need for using a plurality of cells within a single battery pack and improving the performance of the battery pack.

BRIEF SUMMARY OF THE INVENTION

The present invention has been made in view of the above problems, and the present invention provides a battery pack including at least two battery cells.

The present invention also provides a battery pack including a protection circuit module (PCM) assembly capable of controlling charge and discharge of at least two battery cells.

The present invention also provides a battery pack including a connection tab connecting at least two battery cells to a protection circuit module assembly.

The present invention also provides a battery pack including a top case and a bottom case that are coupled with at least two battery cells.

The battery pack may include at least two battery cells to provide a high capacity battery pack.

The battery pack may include a single PCM assembly controlling at least two battery cells to decrease inferior performance due to overcharge and overdischarge.

Since a connector tab electrically connecting at least two battery cells to a single PCM assembly may be provided, the connector tab may be configured so as not to be separated during the swelling of the battery cells to prevent inferior contact.

A top case and a bottom case may be provided to be coupled with at least two battery cells to maintain a secure coupling between the at least two battery cells.

One aspect of the invention comprises a battery assembly comprising a first battery cell, a second battery cell wherein the first and second battery cells are mounted adjacent each other, a protection circuit module that is electrically coupled to the first and second battery cells, and at least one connector tab that includes a protection circuit mounting portion and a first and second battery cell mounting portions wherein the protection circuit module is coupled to the protection circuit mounting portion and the first and second battery cells are coupled to the first and second battery cell mounting portions and wherein the protection circuit mounting portion is displaced in a first direction from the first and second battery cell mounting portions.

Another aspect of the invention comprises a method of assembling a battery pack, the method comprising positioning a first and a second battery cell adjacent each other; and electrically coupling the first and second battery cells together and to a protection circuit with at least one connector tab, wherein the at least one connector tab includes a protection circuit mounting portion and a first and second battery cell mounting portions wherein the first and second battery cells and the protection circuit are mounted to the at least one connector tab so that the protection circuit is offset from the first and second battery cells in a first direction.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
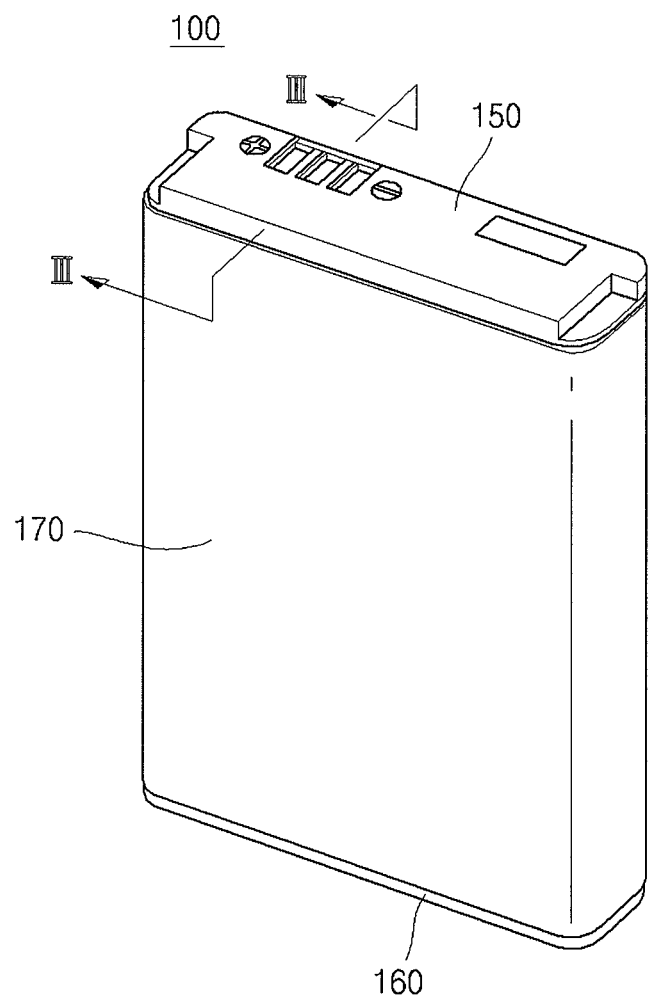
FIG. 1 is a perspective view illustrating an external appearance of a battery pack according to an embodiment of the present invention.
Figure 2:
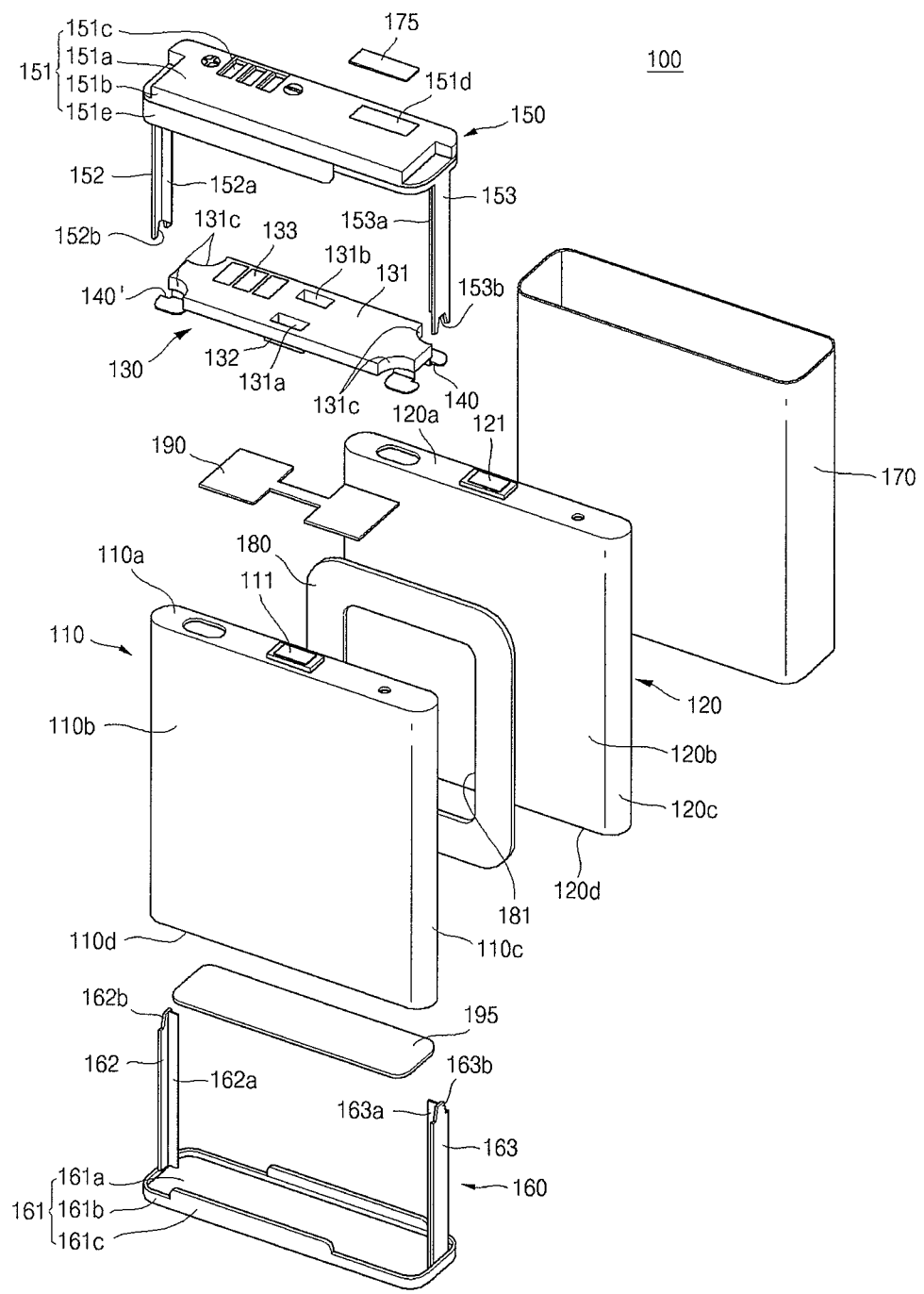
FIG. 2 is an exploded perspective view illustrating the battery pack in FIG. 1.
Figure 3:
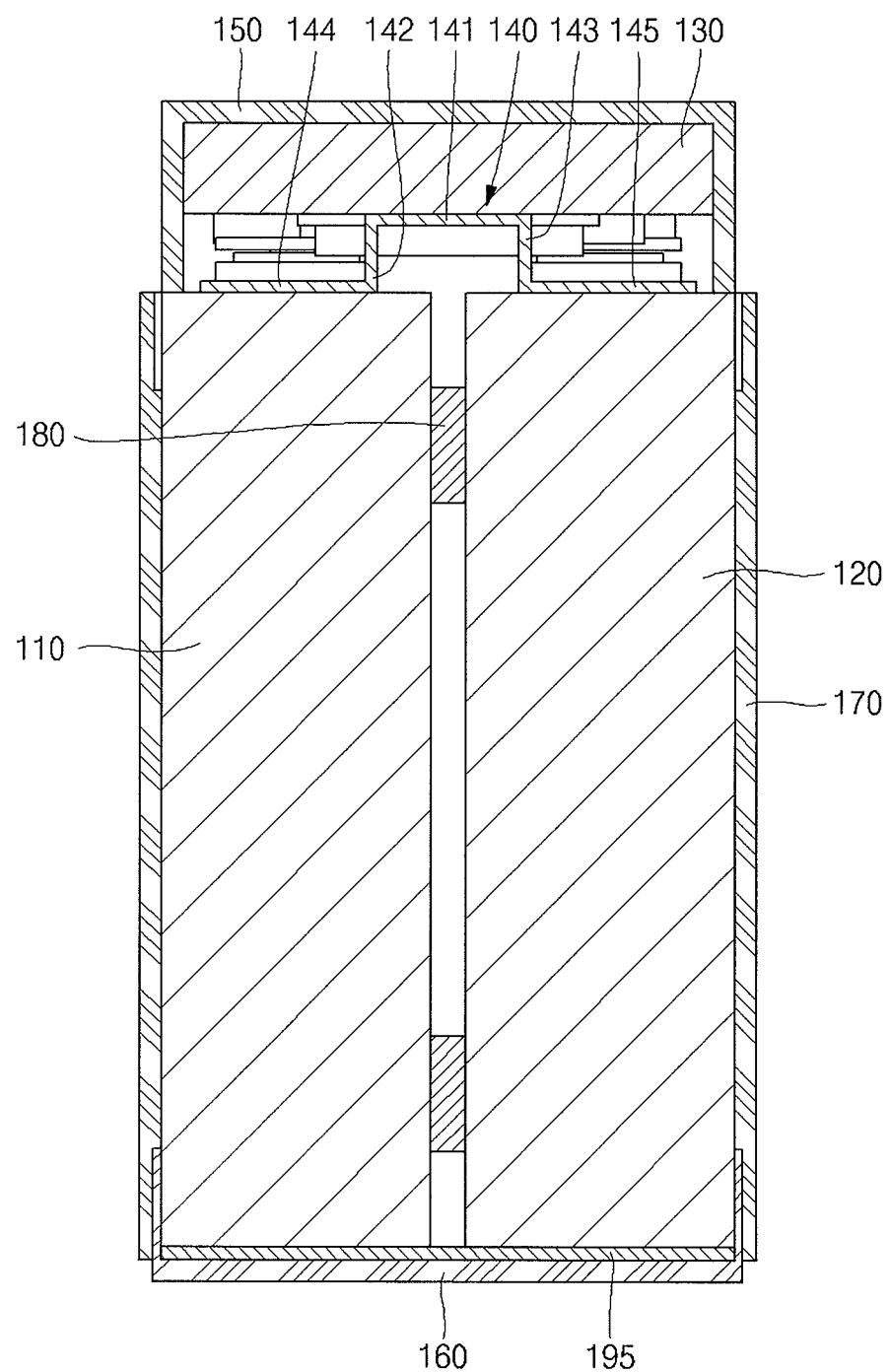
FIG. 3 is a sectional view of the battery pack taken along the line III-III in FIG. 1.
Figure 4:
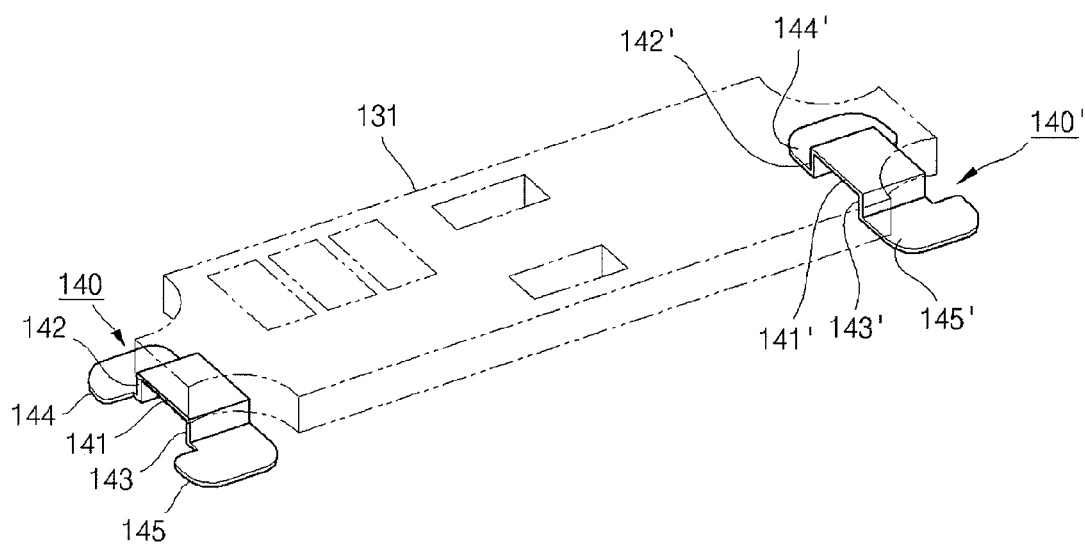
FIG. 4 is a perspective view illustrating a connector tab employed in the battery pack according to the embodiment of the present invention.

Hereinafter, embodiments of the present invention will be described in detail with reference to the accompanying drawings.

Referring to FIGS. 1 to 4, a battery pack 100 according to an embodiment of the present invention includes a first battery cell 110, a second battery cell 120 electrically connected to the first battery cell 110, a protection circuit module (PCM) assembly 130 electrically connected to the first battery cell 110 and the second battery cell 120, a top case 150 accommodating the PCM assembly 130 and coupled to tops of the first and second battery cells 110 and 120, a bottom case 160 coupled to the lower sides of the first and second battery cells 110 and 120, and a label 170 wrapping lateral sides of the first and second battery cells 110 and 120.

The battery pack 100 further includes connector tabs 140 and 140' electrically connecting the PCM assembly 130 to the first battery cell 110 and the second battery cell 120.

Each of the first battery cell 110 and the second battery cell 120 has an approximate hexahedron. However, the shapes of the first and second battery cells 110 and 120 are not limited to the hexahedron. From tops 110a and 120a of the first and second battery cells 110 and 120, negative terminals 111 and 121 respectively protrude outwardly. The lateral sides of the first and second battery cells 110 and 120 include two wide lateral sides 110b and 120b and two narrow lateral sides 110c and 120c that face each other. Bottoms 110d and 120d of the first and second battery cells 110 and 120 are integrally formed with the wide lateral sides 110b and 120b and the narrow lateral sides 110c and 120c.

The first battery cell 110 and the second battery cell 120 are bonded to each other in a way that one of the wide lateral sides 110b and one of the wide lateral sides 120b are facing and are bonded to each other. In this case, a spacer such as an insulator tape 180 is interposed between the wide lateral side 110b of the first battery cell 110 and the wide lateral side 120b of the second battery cell 120. Preferably, the insulator tape 180 is a double-sided adhesive tape.

The insulator tape 180 has a through-hole 181 formed in the middle thereof. Preferably, the through-hole 181 has a rectangular shape, but its shape is not limited thereto. A space defined by the through-hole 181 acts as an escaping or release space that is preferably sized so as to accommodate the increased thicknesses of the first and second battery cells 110 and 120 occurring as a result of swelling of the battery cells 110, 120.

The PCM assembly 130 includes a circuit board 131, an electric device 132 installed on the circuit board 131, and an external terminal 133 conducting current from the battery cells to the outside.

The circuit board 131 has a rectangular shape with a width corresponding to the tops 110a and 120a of the two battery cells 110 and 120. The circuit board 131 has electrode through-holes 131a and 131b such that the negative terminal 111 of the first battery cell 110 and the negative terminal 121 of the second battery cell 120 are electrically connected to a negative terminal (not shown) of the circuit board 131. The circuit board 131 has cutaway portions 131c formed at four corners. Each of the cutaway portions 131c has an arc shape but the shape is not limited thereto. The cutaway portions 131c are formed to enable laser welding of the connector tabs 140 and 140' to the tops of the battery cells 110 and 120. Any shape enabling the laser welding may be employed in the cutaway portions 131c. Further, the overall configuration of the circuit board 131 may be selected to permit access to perform the laser welding of the connector tabs 140, 140'.

The connector tabs 140 and 140' include board connection portions 141 and 141' installed on the circuit board 131, first cell connection portions 144 and 144' connected to the first battery cell 110, second cell connection portions 145 and 145' connected to the second battery cell 120, first connectors 142 and 142' connecting the board connection portions 141 and 141' to the first cell connection portions 144 and 144', and second connectors 143 and 143' connecting the board connection portions 141 and 141' to the second cell connection portions 145 and 145'.

Thus, the circuit board 131 is supported by the first connector tab 140 and the second connector tab 140' to be placed on the tops 110a and 120a of the first battery cell 110 and the second battery cell 120.

Since the structure of the first connector tab 140 is identical to that of the second connector tab 140', hereinafter the first connector tab 140 only will be described in detail. The board connection portion 141 is parallel to the circuit board 131. The first connector 142 and the second connector 143 are integrally formed with the lower sides of the lateral edges of the board connection portion 141. The first cell connection portion 144 is integrally formed with an edge of the first connector 142 and the second connection portion 145 is integrally formed with an edge of the second connector 143. The first and second connection portions 144 and 145 are formed at the edges of the first and second connectors 142,143 to face each other by interposing the board connection portion 141 therebetween.

Thus, the circuit board 131 is electrically connected to the two battery cells 110 and 120 at once by the connector tabs 140 and 140'. In this configuration, the first battery cell 110 is connected in parallel to the second battery cell 120.

The first connector tab 140 and the second connector tab 140' electrically connect positive terminals of the first and second battery cells 110 and 120 (surfaces of the battery cells) to a positive terminal (not shown) of the circuit board 131. In this case, at least one of the first and second connector tabs 140 and 140' connects the first and second battery cells 110 and 120 to the circuit board 131. Preferably, the first and second connector tabs 140 and 140' are made of nickel or nickel alloy with good electrical conductivity, but are not limited thereto. Thus, any one of the first and second connector tabs 140 and 140', which electrically connects the battery cells 110 and 120 to the circuit board 131, may be made of the nickel with good electrical conductivity and the other may not be made of an electrical conductor.

The top case 150 includes a case body 151 and right and left frames 152 and 153. The case body 151 has a hexahedron shape with an internal space accommodating the PCM assembly 130, and the right and left frames 152 and 153 are integrally formed with right and left ends of the case body 151. The case body 151 includes a single planar surface 151a and four lateral sides 151b extending from the planar surface 151a. The planar surface 151a has external terminal through-holes 151c formed at a side and a water-sensitive label attachment 151d formed at the other side. Guide ribs 151e to which the label 170 is attached extend downwardly from the four lateral sides 151b. The right and left frames 152 and 153 are formed at the case body 151 in the vertical direction. The right and left frames 152 and 153 have protrusions 152a and 153a formed at inner middle portions thereof respectively. The protrusions 152a and 153a are formed in the longitudinal directions of the right and left frames 152 and 153. The protrusions 152a and 153a are inserted into gaps G defined by the narrow lateral sides 110c and 120c of the first and second battery cells 110 and 120 that are adhered to each other.

The bottom case 160 includes a case body 161 and right and left frames 162 and 163. The case body 161 has a rectangular shape with a size sufficient to accommodate the bottoms of the first and second battery cells 110 and 120, and the right and left frames 162 and 163 are integrally formed with right and left edges of the case body 161. The case body 161 includes a single planar surface 161a and both lateral sides 161b extending from an edge of the planar surface 161a. Guide ribs 161e to which the label 170 is attached extend from the lateral sides 161b. The right and left frames 162 and 163 are formed at the case body 161 in the vertical direction. The right and left frames 162 and 163 have protrusions 162a and 163a formed at inner middle portions thereof respectively. The protrusions 162a and 163a may be formed in the longitudinal directions of the right and left frames 162 and 163. The protrusions 162a and 163a are inserted into gaps G defined by the narrow lateral sides 110c and 120c of the first and second battery cells 110 and 120 that are adhered to each other.

Grooves 152b and 153b are formed at ends of the right and left frames 152 and 153 of the top case 150 respectively. Protrusions 162b and 163b are formed at ends of the right and left frames 162 and 163 of the bottom case 160 to be inserted into the grooves 152b and 153b respectively. The grooves 152b and 153b and the protrusions 162b and 163b may have any shapes enabling male-female coupling.

The label 170 is attached to wrap a circumference of an assembly of the first and second battery cells 110 and 120, the top case 150, and the bottom case 160 at least one turn. Thus, the first and second battery cells 110 and 120 are securely assembled such that the wide lateral sides 110b and 120b are bonded to each other with the insulation tape 180 and are wrapped by the label 170. The label 170 is made of insulator and insulates the first and second battery cells 110 and 120 from the external device.

An upper end of the label 170 wraps the guide ribs 151e of the top case 150 and a lower end of the label 170 wraps the guide ribs 161c of the bottom case 160. Thus, the top case 150 and the bottom case 160 are coupled with the first and second battery cells 110 and 120 by the label 170.

The tops 110a and 120a of the first and second battery cells 110 and 120 are adhered with a second insulator tape 190. Due to the second insulator tape 190, the first and second battery cells 110 and 120 are insulated from the PCM assembly 130.

The bottoms 110d and 120d of the first and second battery cells 110 and 120 are adhered with an adhesive tape 195. The adhesive tape 195 securely adheres to the first battery cell 110 and the second battery cell 120. Moreover, the adhesive tape employs a double-sided tape. Thus, due to the adhesive tape 195, the bottom case 160 can be securely adhered to the bottoms 110d and 120d of the first and second battery cells 110 and 120.

An assembling process of the battery pack according to the embodiment of the present invention will be described.

1. Attach the First Battery Cell and the Second Battery Cell with the Insulator Tape.

Figure 5A:
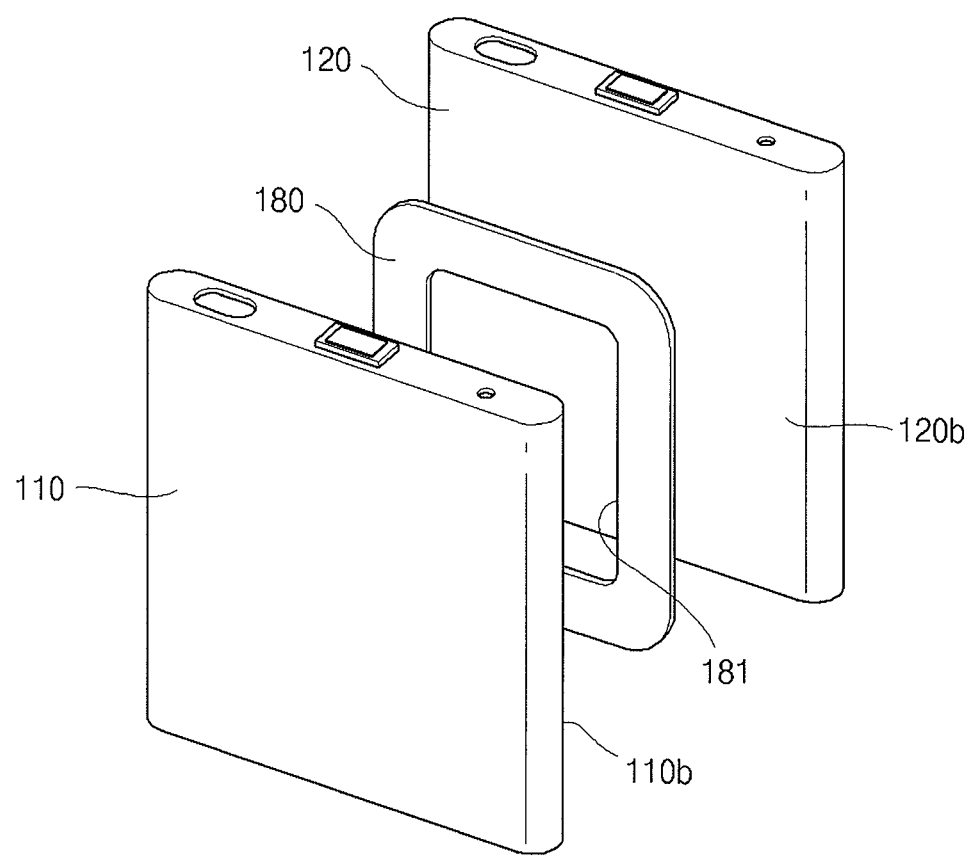
FIGS. 5A to 5H are perspective views illustrating an assembling process of the battery pack according to the embodiment of the present invention.

Referring to FIG. 5A, when one wide lateral side 110b of the first battery cell 110 faces one wide lateral side 120b of the second battery cell 120, the insulator tape 180 is interposed therebetween and the first and second battery cells 110 and 120 are closely adhered to each other. Thus, the first and second battery cells 110 and 120 are adhered to each other while maintaining a space between the battery cells corresponding to the thickness of the insulator tape 180. The insulator tape 180 has the through-hole 181. The through-hole 181 corresponds to an approximate middle portion where the battery cells swell during the charge of the battery cells. In general, when a battery cell is charged approximately 500 times, a thickness increases by about 10% of the initial thickness. Even a battery cell repeatedly charged several times can escape through the through-hole of the insulator tape 180 as much as the increased thickness. Thus, the first battery cell 110 and the second battery cell 120 are less likely to push each other while maintaining the assembled state.

2. Adhere the Second Insulator Tape to the Tops of the First and Second Battery Cells.

Figure 5B:
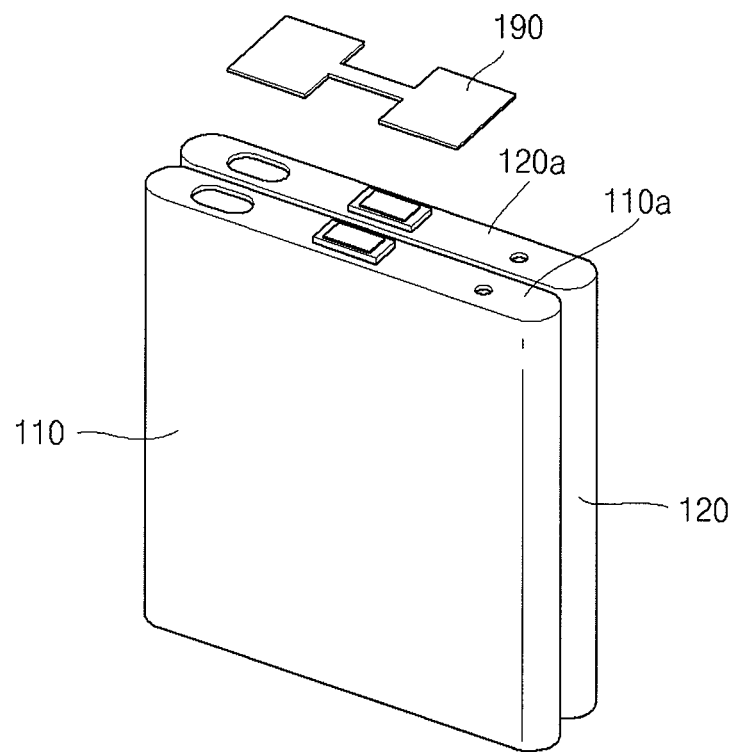

Referring to FIG. 5B, the second insulator tape 190 is adhered to the tops 110a and 120a of the first and second battery cells 110 and 120 to cover the tops 110a and 120a.

The tops 110a and 120a of the first and second battery cells 110 and 120 function as positive electrodes. Thus, the second insulator tape 190 inhibits shorting with other elements.

3. Place the PCM Assembly on the Tops of the First and Second Battery Cells to be Welded.

Figure 5C:
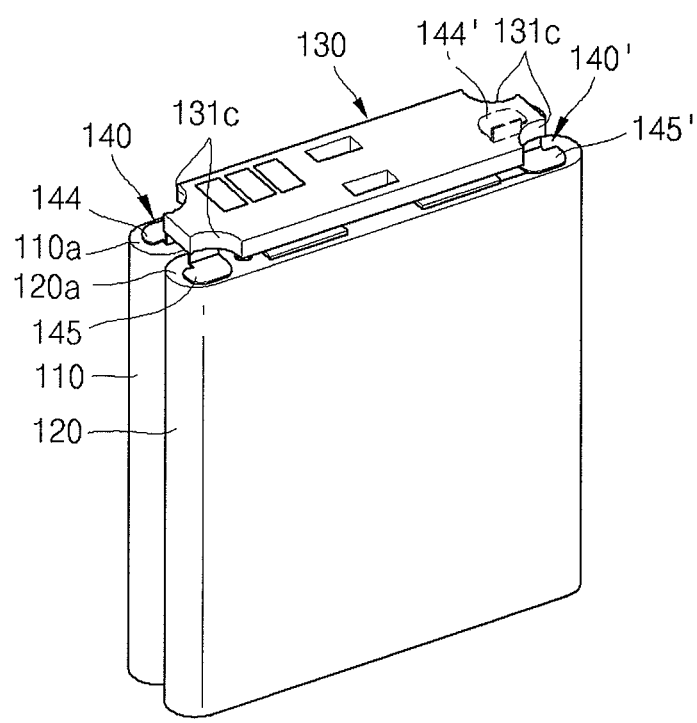

Referring to FIG. 5C, the PCM assembly 130 is welded to the first connector tab 140 and the second connector tab 140'. Firstly, the board connection portions 141 and 141' of the connector tabs 140 and 140' are welded to the bottom of the circuit board 131. And, the first and second cell connection portions 144, 145, 144', and 145' of the connector tabs 140 and 140' are placed on the tops 110a and 120a of the first and second battery cells 110 and 120 respectively.

The PCM assembly 130 is welded to the battery cells such that the first and second cell connection portions 144 and 145 of the first connector tab 140 and the first and second cell connection portions 144' and 145' of the second connector tab 140' are welded to the tops 110a and 120a of the first and second battery cells 110 and 120 by means of a laser. In this case, the first and second cell connection portions 144 and 145 of the first connector tab 140 and the first and second cell connection portions 144' and 145' of the second connector tab 140' are exposed through the cutaway portions 131c formed at the four corners of the circuit board 131 so that the laser welding can be carried out.

Cases of the first and second battery cells 110 and 120 may be made of aluminum (Al) and the first and second connector tabs 140 and 140' may be made of nickel (Ni). Aluminum and nickel allow excellent laser welding.

4. Adhere the Adhesive Tape to the Bottoms of the First and Second Battery Cells.

Figure 5D:
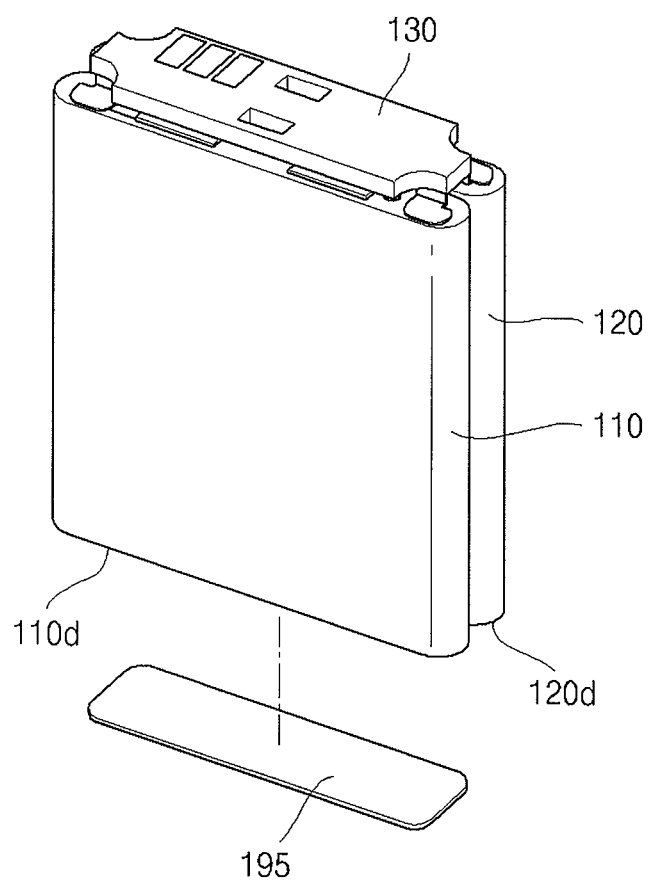

Referring to FIG. 5D, a single adhesive tape 195 is adhered to the bottoms 110d and 120d of the first and second battery cells 110 and 120. Thus, the first and second battery cells 110 and 120 maintain a securely bonded state.

5. Couple the Bottom Case.

Figure 5E:
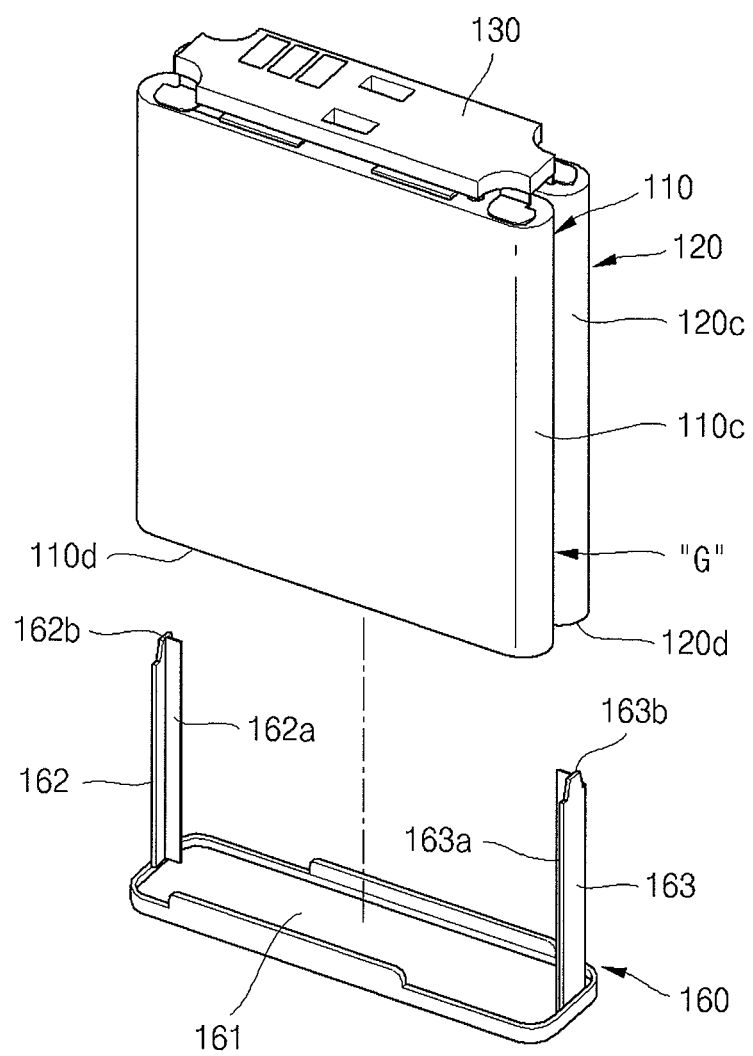

Referring to FIG. 5E, the bottom case 160 is coupled with the lower sides of the first and second battery cells 110 and 120. The case body 161 of the bottom case 160 supports the bottoms 110d and 120d of the first and second battery cells 110 and 120. The right and left frames 162 and 163 of the bottom case 160 support the narrow lateral sides 110c and 120c of the first and second battery cells 110 and 120. The protrusions 162a and 163a of the right and left frames 162 and 163 are inserted into the gaps G defined between the narrow lateral sides 110c and 120c of the first and second battery cells 110 and 120. The protrusions 162a and 163a closely contact the first and second battery cells 110 and 120 to prevent movement of the case body 161.

The bottom case 160 maintains adhesion to the first and second battery cells 110 and 120 by means of the double-sided tape, which is the adhesive tape 195 adhered to the bottoms 110d and 120d of the first and second battery cells 110 and 120.

6. Couple the Top Case.

Figure 5F:
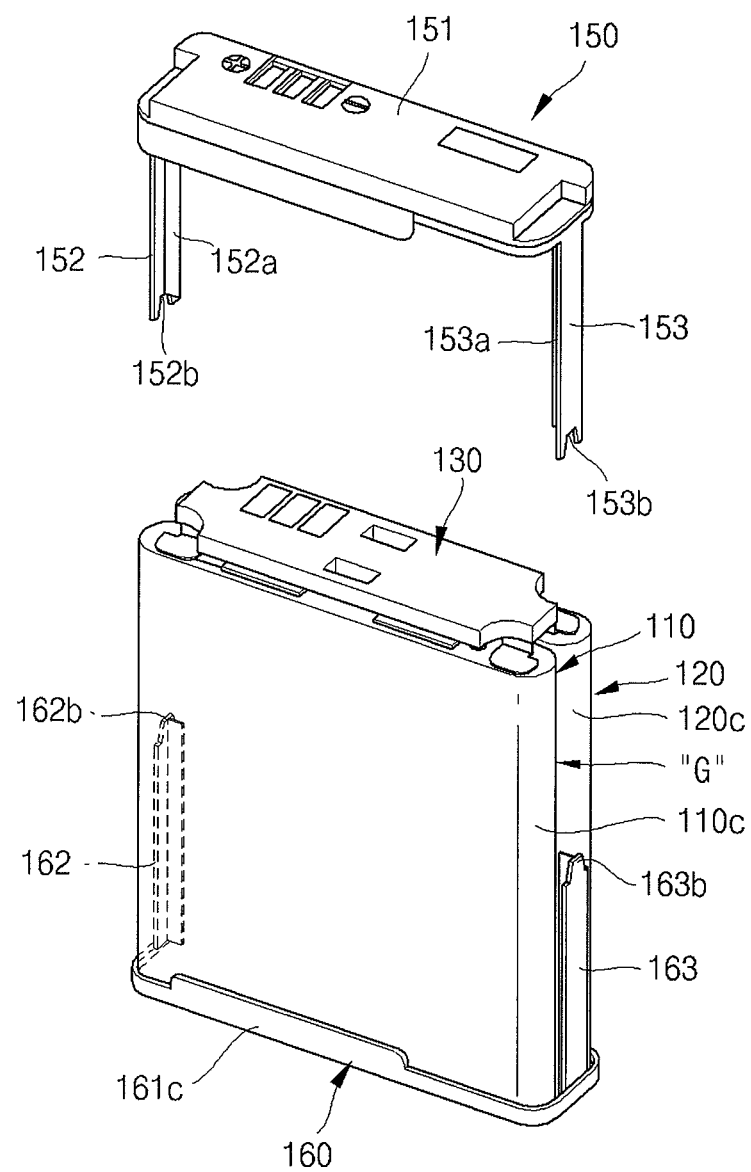

Referring to FIG. 5F, the top case 150 is coupled with the tops of the first and second battery cells 110 and 120 on which the PCM assembly 130 is placed.

The case body 151 of the top case 150 is placed on the top of the PCM assembly 130. The right and left frames 152 and 153 of the top case 150 support the narrow lateral sides 110c and 120c of the first and second battery cells 110 and 120. Protrusions 152a and 153a of the right and left frames 152 and 153 are inserted into the gaps G defined between the narrow lateral sides 110c and 120c of the first and second battery cells 110 and 120 to inhibit movement of the case body 151.

The top case 150 is coupled with the bottom case 160. The protrusions 162b and 163b formed at the ends of the right and left frames 162 and 163 of the bottom case 160 are inserted into the grooves 152b and 153b formed at the ends of the right and left frames 152 and 153 of the top case 150, so that male-female coupling is established.

7. Attach the Label.

Figure 5G:
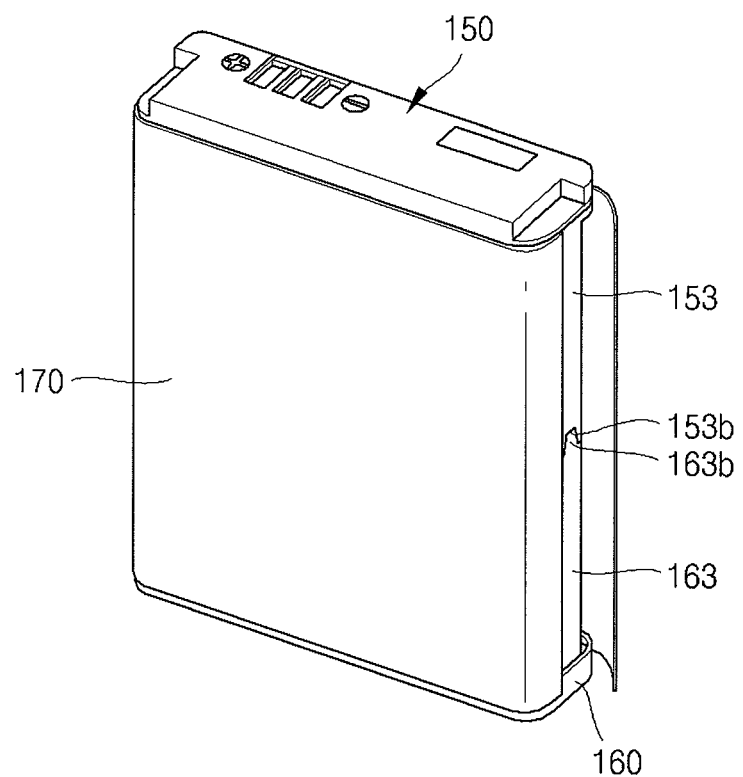

Referring to FIG. 5G, the label 170 fully wraps the circumference of the first and second battery cells 110 and 120 at least one turn. The right and left frames 152, 153, 162, and 163 of the top case 150 and the bottom case 160 fill up the gaps G between the first and second battery cells 110 and 120. When the label 170 is wrapped, the right and left frames 152, 153, 162, and 163 of the top case 150 and the bottom case 160 support the label 170.

An upper end of the label 170 is attached to the guide ribs 151e of the top case 150 to fix the top case 150 to the first and second battery cells 110. A lower end of the label 170 is attached to the guide ribs 161c of the bottom case 160 to fix the bottom case 160 to the first and second battery cells 110 and 120.

8. Attach the Water-Sensitive Label.

Figure 5H:
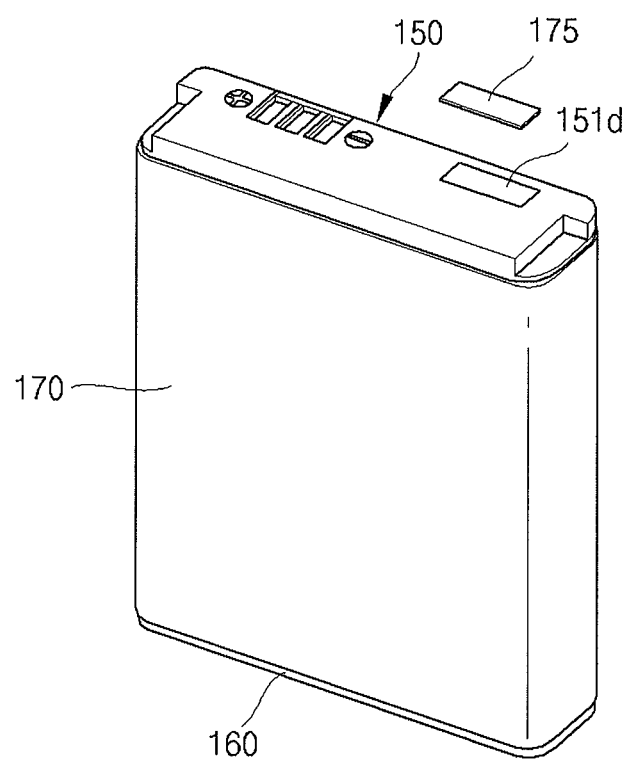

Referring to FIG. 5H, the water-sensitive label 175 is attached to the water-sensitive label attachment 151d formed on the top of the top case 150. In this implementation, the label 175 is a water sensitive label that turns color when the battery is exposed to water. In this way, the cause of failure of the device using the battery can be determined, e.g., the label can tell if an electronic device, such as a mobile phone, has been immersed in water.

As described above, in the assembled battery pack according to the embodiment of the present invention, the two battery cells are controlled by the single PCM assembly during the charge and discharge so that inferior performance caused by overcharge and overdischarge is reduced.

The first and second battery cells 110 and 120 are electrically connected to the PCM assembly 130 such that the negative terminals 111 and 121 of the battery cells 110 and 120 are electrically connected to negative terminals (not shown) of the circuit board 131. The first and second battery cells 110 and 120 are electrically connected to positive terminals (not shown) of the circuit board 131 by the first and second connector tabs 140 and 140'.

On the tops of the first and second battery cells 110 and 120, the connector tabs 140 and 140' support the PCM assembly 130. The connector tabs 140 and 140' respectively have a bridge shape in which the board connection portions 141 and 141', the first and second connection portions 142, 142', 143, and 143', the first cell connection portions 144 and 144', and the second cell connection portions 145 and 145' are integrally formed with each other.

Although the connector tabs 140 and 140' of the battery pack 100 according to the embodiment of the present invention respectively are configured such that vertical relationships between the board connection portions 141 and 141', and the first and second connection portions 142, 142', 143, and 143' and the first and second cell connection portions 144, 144', 145, and 145' are established, another relationship may be possible.

A battery pack according to another embodiment of the present invention will be described.

Figure 6A:
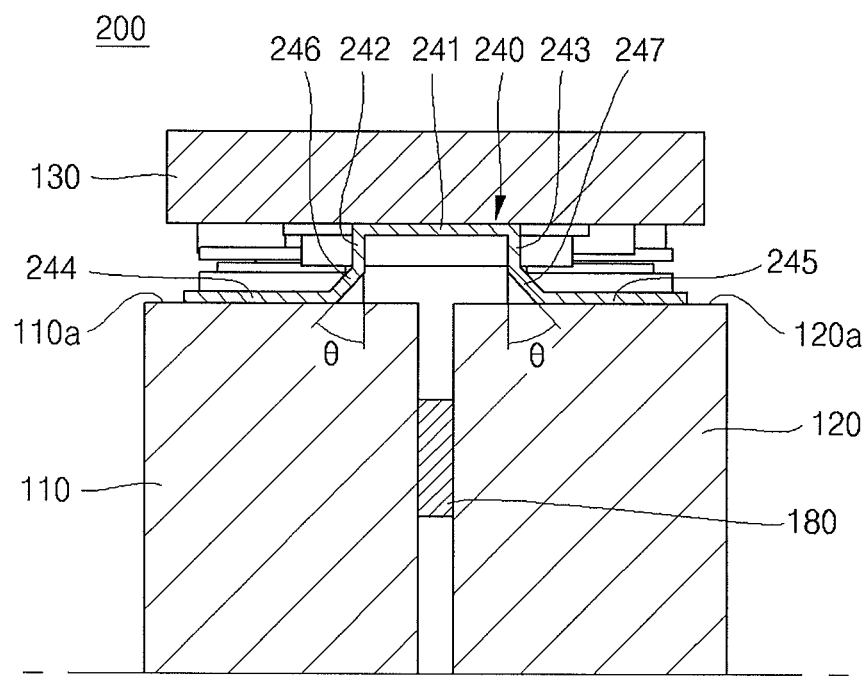
FIG. 6A is a sectional view illustrating main parts of the battery pack according to the embodiment of the present invention.
Figure 6B:
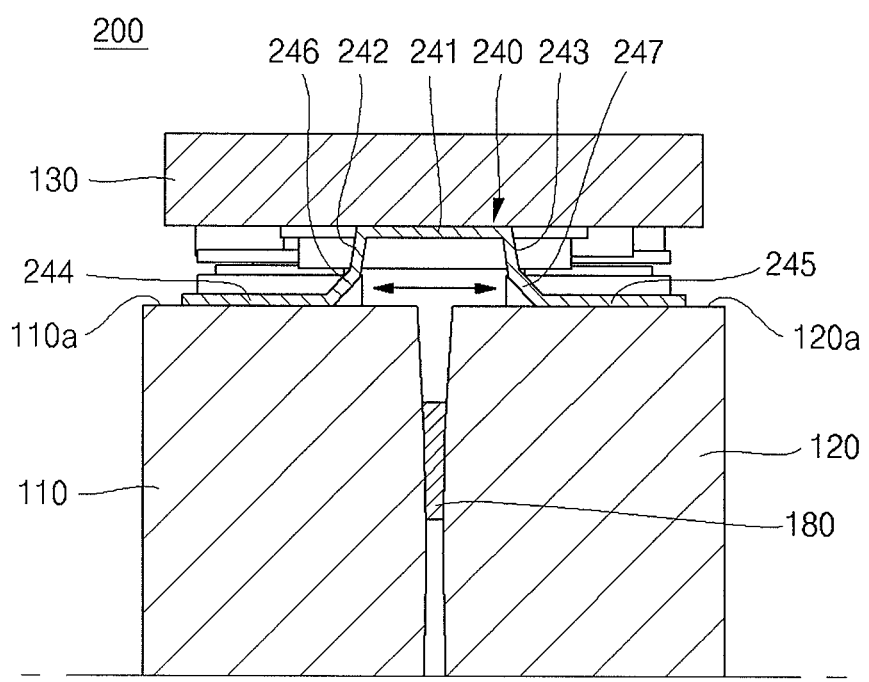
FIG. 6B is a sectional view illustrating a swelling occurring in the battery pack in FIG. 6A.

FIGS. 6A and 6B, a battery pack 200 according to another embodiment of the present invention includes a first battery cell 110 and a second battery cell 120 electrically connected to the first battery cell 110, a protection circuit module (PCM) assembly 130 electrically connected to the first and second battery cells 110 and 120, a top case 150 accommodating the PCM assembly 130 and coupled to tops of the first and second battery cells 110 and 120, a bottom case 160 coupled to the lower sides of the first and second battery cells 110 and 120, and a label 170 wrapping lateral sides of the first and second battery cells 110 and 120. This configuration is substantially the same to that of the battery pack 100 according to the embodiment of the present invention. The same reference numerals are assigned to the same elements and their description will be omitted.

The battery pack 200 according to another embodiment of the present invention includes a connector tab, different from that of the battery pack 100 according to the previous embodiment of the present invention, electrically connecting the first and second battery cells 110 and 120 to the PCM assembly 130. The connector tab includes first and second connector tabs supporting both ends of the PCM assembly 130. Since the first and second connector tabs are identical to each other, a single connector tab 240 only will be described.

The connector tab 240 in another embodiment of the present invention includes a board connection portion 241 installed in the PCM assembly 130, a first cell connection portion 244 connected to the first battery cell 110, a second cell connection portion 245 connected to the second battery cell 120, a first connection portion 242 connecting the board connection portion 241 to the first cell connection portion 244, and a second connection portion 243 connecting the board connection portion 241 to the second cell connection portion 245.

The board connection portion 241 is parallel to the PCM assembly 130. The first and second connection portions 242, 243 are downwardly formed at edges of the board connection portion 241 in the vertical direction to the board connection portion 241.

The first cell connection portion 244 is integrally formed with an edge of the first connection portion 242 or a slope portion 246 as described below, and the second cell connection portion 245 is integrally formed with an edge of the second connection portion 243 or a slope portion 247 as described below. The first and second cell connection portions 244 and 245 oppositely run from the edges of the first and second connection portions 242 and 243 with respect to the board connection portion 241.

In another embodiment of the present invention, a slope portion 246 is formed between the first connection portion 242 and the first cell connection portion 244 and a slope portion 247 is formed between the second connection portion 243 and the second cell connection portion 245. The slope portions 246 and 247 extend from the lower sides of the first and second connection portions 242 and 243 to the first and second cell connection portions 244 and 245 at a preset angle Θ. Preferably, the angle Θ is approximately 20 degrees to 70 degrees.

Operation of the battery pack according to another embodiment of the present invention will be described.

In the battery pack 200 according to another embodiment of the present invention, when the first and second battery cells 110 and 120 swell, the first and second battery cells 110 and 120, as illustrated in FIG. 6B, are spaced away from each other with respect to the insulator tape 180.

In this case, the connector tab 240 is deformed such that the first and second connection portions 242 and 243 are moved apart from the edges of the board connection portion 241 by the slopes 246 and 247.

The connection portions 242 and 243 of the connector tab 240 moved away from each other as the gap, between the battery cells, increases due to the swelling of the first and second battery cells 110 and 120. Thus, the first and second cell connection portions 244 and 245 of the connector tab 240 are less likely to be separated from the tops 110a and the 120a of the first and second battery cells 110 and 120, so that the welded state can be maintained and the inferior welds do not occur.

When the angle Θ of the slopes 246 and 247 is less than 20 degrees, since an angle between each of the connection portions 242 and 243 and each of the slopes 246 and 247 is small and the connection portions 242 and 243 do not substantially spread, the first and second cell connection portions 244 and 245 are more likely to be separated from the tops 110a and 120a of the first and second battery cells 110 and 120. Moreover, when the angle Θ of the slopes 246 and 247 is greater than 70 degrees, since an angle between each of the first and second cell connection portions 244 and 245 and each of the slopes 246 and 247 is small and the connection portions 242 and 243 do not spread, the first and second cell connection portions 244 and 245 are more likely to be separated from the tops 110a and 120a of the first and second battery cells 110 and 120.

A battery pack 300 according to still another embodiment of the present invention will described as follows.

Figure 7:
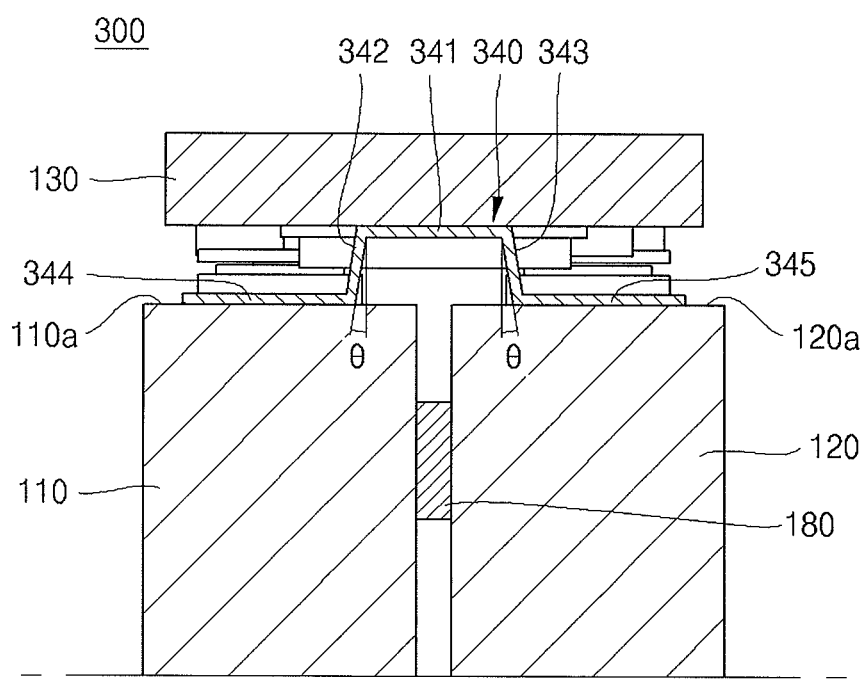
FIG. 7 is a sectional view illustrating main parts of a battery pack according to another embodiment of the present invention.

Referring to FIG. 7, since the battery pack 300 according to still another embodiment of the present invention is established by a connector tab, the battery pack 300 will be described by concentrating on the connector tab.

A connector tab 340 in the battery pack 300 according to still another embodiment of the present invention includes a board connection portion 341 installed in the PCM assembly 130, a first cell connection portion 344 electrically connected to the first battery cell 110, a second cell connection portion 345 electrically connected to the second battery cell 120, a first connection portion 342 electrically connecting the board connection portion 341 to the first cell connection portion 344, and a second connection portion 343 electrically connecting the board connection portion 341 to the second cell connection portion 345.

The board connection portion 341 is parallel to the PCM assembly 130. The first and second connection portions 342 and 343 are obliquely connected to edges of the board connection portion 341.

The first cell connection portion 344 is integrally formed with an edge of the first connection portion 342, and the second cell connection portion 345 is integrally formed with an edge of the second connection portion 343. The first and second cell connection portions 344 and 345 oppositely run from the edges of the first and second connection portions 342 and 343 with respect to the board connection portion 341, respectively.

In the connector tab 340 of the battery pack 300 according to still another embodiment of the present invention, the first and second connection portions 342 and 343 extend from the edges of the board connection portion 341 outwardly oblique to the vertical direction. In other words, the connector tab 240 of the battery pack 200 according to another embodiment of the present invention is configured such that the slopes 246 and 247 are formed at some portions of the first and second connection portions 242 and 243, and in still another embodiment, the first and second connection portions 342 and 343 wholly form the slopes.

The first and second connection portions 342 and 343 extend from the edges of the board connection portion 341 toward the first and second cell connection portions 344 and 345 at a preset angle Θ, respectively. Preferably, the preset angle Θ ranges approximately from 20 degrees to 70 degrees. When the angle Θ is less than 20 degrees or greater than 70 degrees, a gap between the connection portions 342 and 343 does not increase in a case that an external force is exerted, so that the contact inferiority occurs.

Operation of the battery pack 300 according to still another embodiment of the present invention will be described.

In this embodiment, when the first and second battery cells 110 and 120 swell, the connector tab 340 spreads laterally with respect to the board connection portion 341.

Thus, the first and second connection portions 342 and 343 of the connector tab 340 are moved away from each other as the gap increases due to the swelling of the first and second battery cells 110 and 120. Consequently, the first and second cell connection portions 344 and 345 of the connector tab 340 are less likely to be separated from the tops 110a and 120a of the first and second battery cells 110 and 120 while maintaining the welded state, so that the contact inferiority does not occur.

A battery pack 400 according to still another embodiment of the present invention will be described.

Figure 8:
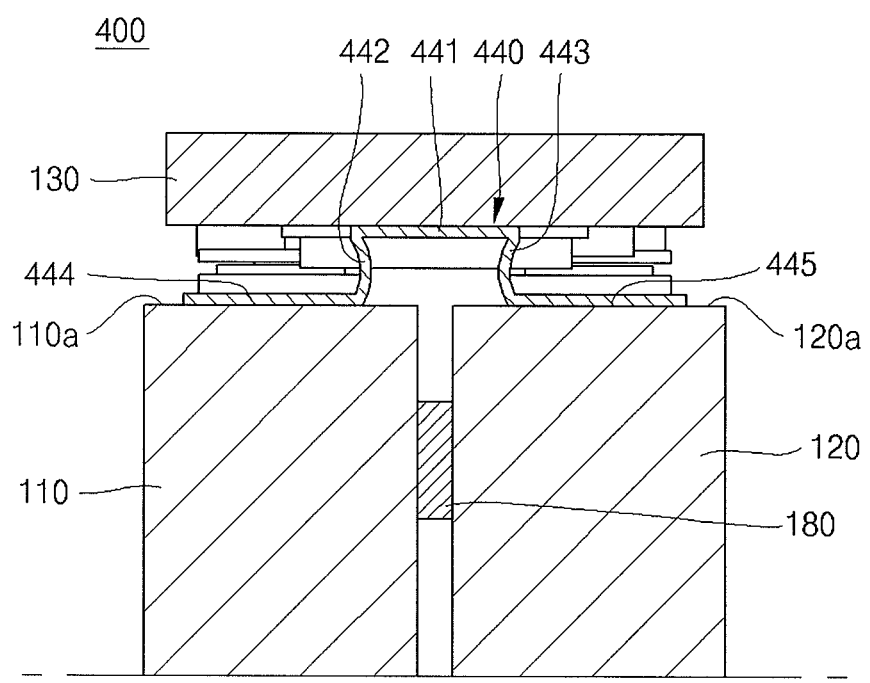
FIG. 8 is a sectional view illustrating main parts of a battery pack according to still another embodiment of the present invention.

Referring to FIG. 8, since the battery pack 400 according to still another embodiment of the present invention is established by a connector tab, the battery pack 400 will be described by concentrating on the connector tab.

A connector tab 440 in the battery pack 400 according to still another embodiment of the present invention includes a board connection portion 441 installed in the PCM assembly 130, a first cell connection portion 444 electrically connected to the first battery cell 110, a second cell connection portion 445 electrically connected to the second battery cell 120, a first connection portion 442 electrically connecting the board connection portion 441 to the first cell connection portion 444, and a second connection portion 443 electrically connecting the board connection portion 441 to the second cell connection portion 445.

The board connection portion 441 is parallel to the PCM assembly 130. The first and second connection portions 442 and 443 are rounded at edges of the board connection portion 441.

The first cell connection portion 444 is integrally formed with an edge of the first connection portion 442, and the second cell connection portion 445 is integrally formed with an edge of the second connection portion 443. The first and second cell connection portions 444 and 445 oppositely run from the edges of the first and second connection portions 442 and 443 with respect to the board connection portion 441, respectively.

The first and second connection portions 442 and 443 of the connector tab 440 are rounded.

The first and second connection portions 442 and 443 are respectively bent at the edges of the board connection portion 441 opposite to the positions where the first and second cell connection portions 444 and 445 and bent again from their middle portions toward the positions of the first and second cell connection portions 444 and 445.

Even in the battery pack 400 employing the connector tab 400, when the first and second battery cells 110 and 120 swell, the first and second connection portions 442 and 443 of the connector tab 400 spread in the lateral direction.

Thus, the first and second connection portions 442 and 443 of the connector tab 440 are moved apart from each other as the gap increase due to the swelling of the first and second battery cells 110 and 120. Consequently, the first and second cell connection portions 444 and 445 of the connector tab 440 are less likely to be separated from the tops 110a and 120a of the first and second battery cells 110 and 120 while maintaining the welded state, so that the contact inferiority is prevented.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A battery assembly comprising:
a first battery cell;
a second battery cell wherein the first and second battery cells are mounted adjacent each other;
a protection circuit module that is electrically coupled to the first and second battery cells; and
at least one connector tab consisting of a protection circuit mounting portion having an upper surface and a lower surface and a first and second battery cell mounting portions coupled to the lower surface of the protection circuit mounting portion via first and second connection portions that extend outward from the lower surface of the protection circuit mounting portion, wherein the at least one connector tab has a bridge shape in which the protection circuit mounting portions, the first and second connection portions, and the first and second battery cell mounting portions are integrally formed with each other, wherein the protection circuit module is coupled to the upper surface of the protection circuit mounting portion and the first and second battery cells are coupled to the first and second battery cell mounting portions and wherein the protection circuit mounting portion is displaced in a first direction from the first and second battery cell mounting portions.

2. The assembly of Claim 1 further comprising a case that defines an inner recess wherein the first battery cell, the second battery cell, the protection circuit module and the at least one connector tab are positioned in the inner recess.

3. The assembly of claim 2, wherein the case is comprised of a top case, a bottom case and a label, wherein the top case engages with the bottom case with the first and second battery cells and the protection circuit module interposed therebetween and wherein the label is wrapped around the first and second battery cells and extends between the top and bottom case to thereby enclose the first and second battery cells and the protection circuit module.

4. The assembly of claim 1, wherein the protection circuit module is shaped in the regions adjacent the protection circuit mounting portion of the at least one connector tab so as to at least partially expose the battery cell mounting portions of the at least one connector tab to thereby permit laser welding of the battery cell mounting portions to the battery cells.

5. The assembly of claim 4, wherein the protection circuit module is generally rectangular in shape having a first and a second end and the at least one connector tab is mounted adjacent a first end of the protection circuit module and wherein the corners of the first end of the protection circuit module are cut-away so as to at least partially expose the battery cell mounting portions of the at least one connector tab.

6. The assembly of claim 1, wherein the first and second battery cells each have two elongate sides and two ends and wherein the first and second battery cells are positioned so that elongate sides of the first and second battery cells are positioned proximate to each other.

7. The assembly of claim 6, further comprising a spacer interposed between the first and second battery cells, wherein the spacer includes an opening that is positioned with respect to the first and second battery cells so as to allow the walls of the first and second battery cells to extend into the opening when swelling to thereby reduce the likelihood that the first and second battery cells will exert pressure against each other due to swelling.

8. The assembly of claim 1, wherein the at least one connector tab comprises a first and a second connector tab wherein at least one of the first and second connector tabs is formed of a conductive material so as to electrically connect the first and second battery cells to the protection circuit module.

9. The assembly of claim 8, wherein the first and second connector tabs each comprise the protection circuit mounting portion having a first and a second outer ends and the first and second battery cell mounting portions and a first and second interconnecting portions respectively interconnecting the first outer end of the protection circuit mounting portion to the first battery cell mounting portion and the second outer end of the protection circuit mounting portion to the second battery cell mounting portion.

10. The assembly of claim 9, wherein the protection circuit mounting portion is coupled to the battery cell mounting portions by the interconnecting portion which is sufficiently flexible so as to permit lateral movement of the battery cell mounting portion relative to the protection circuit mounting portion due to swelling of the battery cells.

11. The assembly of claim 10, wherein the inner end of the first battery cell mounting portion and the inner end of the second battery cell mounting portion are respectively substantially aligned with the first and second outer ends of the protection circuit mounting portion.

12. The assembly of claim 9, wherein the first and second interconnecting sections are substantially straight extending between the first and second outer ends of the protection circuit mounting portion and the inner ends of the first and second battery cell mounting portions.

13. The assembly of claim 9, wherein the first and second interconnection sections are bent so as to extend inward so that disengagement of the first and second battery cells from the first and second connector tabs as a result of movement of the first and second battery cells due to swelling of the battery cells is inhibited.

14. The assembly of claim 9, wherein the first and second interconnecting sections are at least partially sloped so that the inner ends of the first and second battery cell mounting portions are located outward of the first and second outer ends of the protection circuit mounting portion so that disengagement of the first and second battery cells from the first and second connector tabs as a result of movement of the first and second battery cells due to swelling of the battery cells is inhibited.

15. The assembly of claim 14, wherein the first and second interconnecting portions are substantially straight extending at an angle θ to the first direction.

16. The assembly of claim 15, wherein the angle θ is between approximately 20 degrees and 70 degrees to the first direction.

17. The assembly of claim 14, wherein the first and second interconnecting portions include a first substantially straight section that extend in a direction substantially parallel to the first direction and a second angled section wherein the second angled section extends at an angle θ to the first direction.

18. The assembly of claim 17, wherein the substantially straight sections of the first and second interconnecting portions are respectively coupled to the first and second outer ends of the protection circuit mounting portion and the angled section extends outward from the substantially straight sections at an angle θ which is between approximately 20 to 70 degrees from the first direction.

19. The assembly of claim 8, wherein the first and the second connector tabs are identical to each other and support both ends of the protection circuit module.

20. The assembly of claim 1, wherein the first and second connection portions are at least partially sloped.

21. The assembly of claim 1, wherein the first and second connection portions each consist of a substantially straight section and an angled section, wherein the substantially straight section extends in a first direction perpendicular to a plane of the protection circuit mounting portion and wherein the angled section extends at an angle θ which is between approximately 20 to 70 degrees from the first direction.

22. The assembly of claim 1, wherein the protection circuit mounting portion is parallel to the protection circuit module, and wherein the first and second connection portions are obliquely connected to edges of the protection circuit mounting portion.

23. The assembly of claim 1, wherein the first battery cell mounting portion is integrally formed with an edge of the first connection portion, wherein the second battery cell mounting portion is integrally formed with an edge of the second connection portion, and wherein the first and second battery cell mounting portions oppositely run from the edges of the first and second connection portions with respect to the protection circuit mounting portion, respectively.

24. The assembly of claim 1, wherein the first and second connector portions extend from edges of the protection circuit mounting portion outwardly oblique to a vertical direction.

25. The assembly of claim 1, wherein the connector tab is configured to spread laterally with respect to the protection circuit mounting portion when the first and second battery cells swell.

26. The assembly of claim 1, wherein the first and second connector portions are rounded.

27. The assembly of claim 1, wherein the first and second connection portions are respectively bent at edges of the protection circuit mounting portion opposite to positions of the first and second battery cell connection portions and are bent again from their middle portions toward the positions of the first and second cell connection portions.

28. A method of assembling a battery pack, the method comprising:
positioning a first and a second battery cell adjacent each other; and
electrically coupling the first and second battery cells together and to a protection circuit module with at least one connector tab, wherein the at least one connector tab consists of a protection circuit mounting portion having an upper surface and a lower surface and a first and second battery cell mounting portions coupled to the lower surface of the protection circuit mounting portion via first and second connection portions that extend outward from the lower surface of the protection circuit mounting portion, wherein the at least one connector tab has a bridge shape in which the protection circuit mounting portions, the first and second connection portions, and the first and second battery cell mounting portions are integrally formed with each other, wherein the protection circuit module is coupled to the upper surface of the protection circuit mounting portion and the first and second battery cells are coupled to the first and second battery cell mounting portions and wherein the protection circuit mounting portion is displaced in a first direction from the first and second battery cell mounting portions, wherein the first and second battery cells and the protection circuit module are mounted to the at least one connector tab so that the protection circuit module is offset from the first and second battery cells in a first direction.

29. The method of claim 28 further comprising encasing the first and second battery cells and the protection circuit module.

30. The method of claim 28, wherein positioning a first and second battery cell adjacent each other comprises positioning elongate sides of the first and second battery cells proximate each other.

31. The method of claim 30, further comprising positioning a spacer between the elongate sides of the first and second battery cells wherein the spacer includes an opening that is positioned with respect to the first and second battery cells so as to allow the walls of the first and second battery cells to extend into the opening when swelling to thereby reduce the likelihood that the first and second battery cells will exert pressure against each other due to swelling.

32. The method of claim 28, wherein encasing the first and second battery cells and the protection circuit module comprises:
positioning the first and second battery cells in a bottom case;
mounting the protection circuit module to the first and second battery cells via the connection tab;
engaging a top case to the bottom case so that the first and second battery cells and the protection circuit module are interposed between the top and bottom case; and
wrapping a label around the outside of the first and second battery cells, the protection circuit module and the top and bottom case so as to encase the first and second battery cells.

* * * * *